United States Patent
Ruhnau et al.

(10) Patent No.: US 6,964,455 B2
(45) Date of Patent: Nov. 15, 2005

(54) VEHICLE ANTI-LOCK BRAKE SYSTEM AND METHOD

(75) Inventors: Gerhard Ruhnau, Neustadt (DE); Gerald Stanusch, Harsum (DE)

(73) Assignee: WABCO GmbH & Co. oHG, Hannover (DE)

( * ) Notice: Subject to any disclaimer, the term of this patent is extended or adjusted under 35 U.S.C. 154(b) by 0 days.

(21) Appl. No.: 11/055,356

(22) Filed: Feb. 10, 2005

(65) Prior Publication Data

US 2005/0134109 A1    Jun. 23, 2005

Related U.S. Application Data

(63) Continuation of application No. 10/435,621, filed on May 9, 2003.

(30) Foreign Application Priority Data

May 11, 2002  (DE) ................. 102 21 079

(51) Int. Cl.[7] .................... B60T 13/74; B60T 8/88
(52) U.S. Cl. .................. 303/3; 303/122.08
(58) Field of Search ............ 303/3, 7, 15, 121, 303/122, 122.08, 199; 701/1, 70, 71, 82, 701/83; 307/9.1, 10.1

(56) References Cited

U.S. PATENT DOCUMENTS

| | | |
|---|---|---|
| 3,704,043 A | 11/1972 | Hickner et al. |
| 4,819,995 A | 4/1989 | Lohmann et al. |
| 5,130,928 A | 7/1992 | Petersen |
| 5,945,743 A | 8/1999 | Pattantyus et al. |
| 6,256,569 B1 | 7/2001 | Kobayashi |
| 6,343,844 B1 | 2/2002 | McCann et al. |
| 6,513,885 B1 | 2/2003 | Salamat et al. |
| 6,622,077 B2 | 9/2003 | Ruhnau et al. |
| 6,701,225 B1 * | 3/2004 | Schenk et al. ............. 701/1 |

FOREIGN PATENT DOCUMENTS

| | | |
|---|---|---|
| DE | 37 33 801 A1 | 3/1989 |
| DE | 37 38 915 A1 | 5/1989 |
| DE | 39 28 651 A1 | 3/1991 |
| DE | 40 22 671 A1 | 1/1992 |
| DE | 44 10 937 C1 | 3/1994 |
| DE | 44 30 782 A1 | 3/1996 |
| DE | 195 08 559 A1 | 9/1996 |
| DE | 196 34 330 C2 | 2/1998 |
| DE | 197 23 323 A1 | 12/1998 |
| DE | 198 54 788 A1 | 5/2000 |
| DE | 199 23 458 A1 | 11/2000 |
| DE | 199 46 774 A1 | 4/2001 |
| FR | 2488844 A | 2/1982 |

* cited by examiner

OTHER PUBLICATIONS

"ABS/ASR 'D'—'Cab' Version Anti-Blockier-System für Nutzfahrzeuge," WABCO Standard GmbH 1999, p. 9.

Primary Examiner—Thomas Williams
(74) Attorney, Agent, or Firm—Kramer Levin Naftalis & Frankel LLP

(57) ABSTRACT

An anti-lock brake system for a tri-axle wheeled vehicle equipped with wheel speed sensors and modulators for adjusting brake pressure. The modulators are actuated by a six-channel electronic control unit. The modulators associated with the front axle of the vehicle are individually actuated. The modulators associated with the two rear axles of the vehicle are side-by-side or axle modulators, each actuated jointly by respective end stages of the six channels. The electronic control unit detects whether the anti-lock brake system in which it is installed is a compatible anti-lock brake system. An error signal indicating improper installation is delivered.

13 Claims, 3 Drawing Sheets

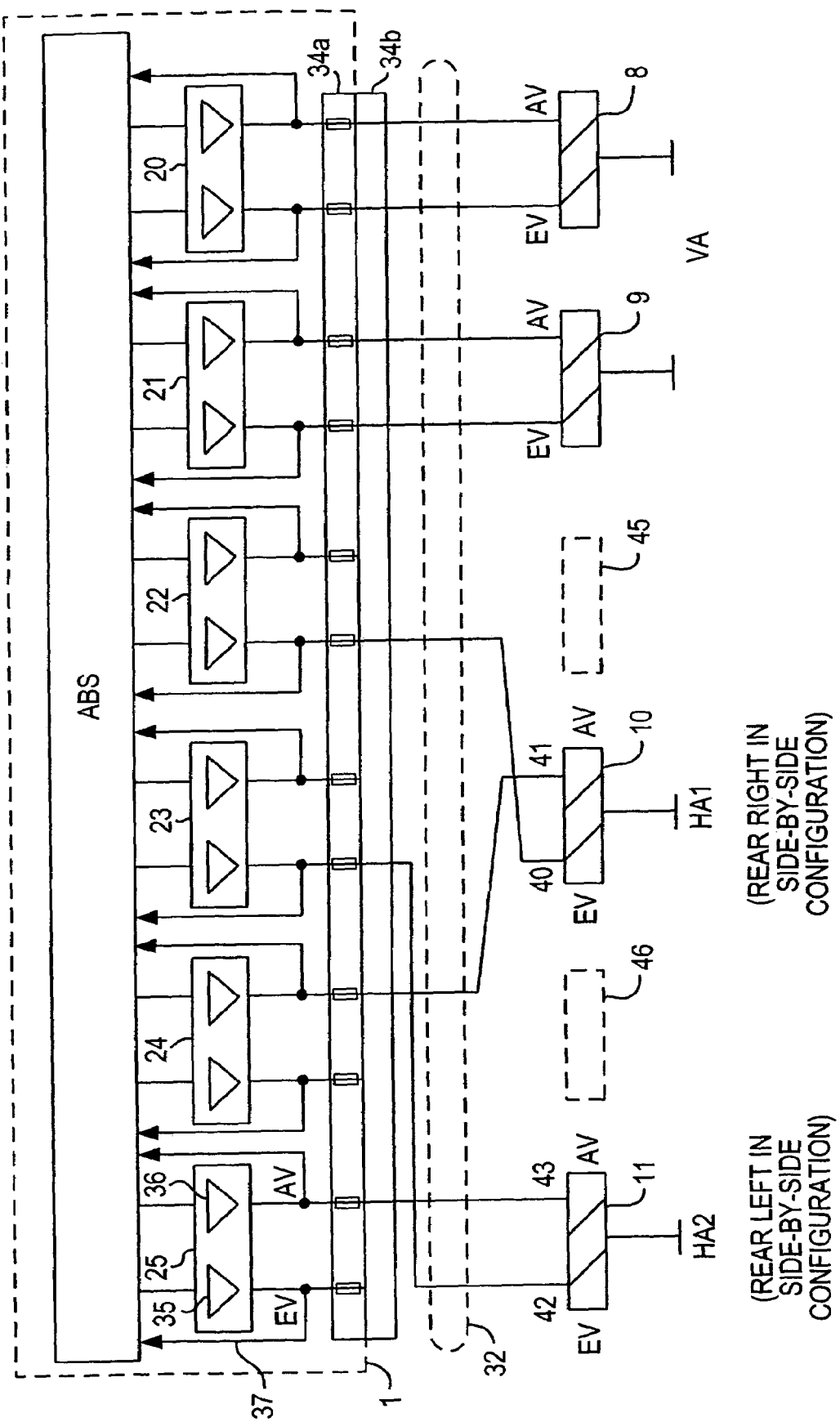

VEHICLE ANTI-LOCK BRAKE SYSTEM AND METHOD

CROSS REFERENCE TO RELATED APPLICATION

This application is a continuation of co-pending U.S. patent application Ser. No. 10/435,621 filed on May 9, 2003 which is hereby incorporated by reference.

BACKGROUND OF THE INVENTION

The present invention is directed generally to a vehicle anti-lock brake system ("ABS") and, more particularly to an ABS in which a single ABS electronic control unit ("ECU") can be used with alternative ABS arrangements and configurations.

ABSs function to prevent locking of individual wheels during vehicle braking and, thus, to shorten braking distance without losing lateral traction, especially during braking on smooth surfaces. For braking of commercial vehicles, a braking medium such as compressed air is typically introduced in controlled manner into the brake cylinders in order to actuate the appropriate wheel brakes. Brake systems of the ABS type are typically equipped with modulators (solenoid valves) in the compressed air lines. Such modulators are actuated by an ABS ECU to increase, maintain or reduce brake pressure. For this purpose, each modulator is provided with an inlet and an outlet valve.

In the case of ABSs for commercial vehicles, a distinction can be made between a large number of conventional systems. For example, commercial vehicles may have one, two, three or more axles. Each axle is usually provided with two wheels, although more wheels may be provided. These wheels may or may not be equipped with sensing devices such as wheel speed sensors.

Each wheel brake may be provided with its own modulator, or, alternatively, one common modulator for each axle or for each side of the vehicle may be provided. Use of a common modulator ensures that the same brake pressure is applied to both wheels of an axle or of one side of the vehicle. In this connection, several regulation strategies are known in the art, including, for example, select-low regulation ("SL"), select-high regulation ("SH"), modified axle regulation ("MAR") (see e.g., DE 3733801) and variable axle regulation ("VAR") (see e.g., DE 19723323).

For commercial vehicles having three axles, one of which is a (steered) front axle and two of which are rear axles, two ABSs are common.

The first of the above-noted common ABSs is equipped with six wheel speed sensors and six brake pressure modulators. This system is known as the "6S/6M system," based on the number of wheel speed sensors (S) and modulators (M). The 6S/6M system provides for individual regulation ("IR"), since all wheels of the vehicle can be regulated individually. Individual regulation has the advantage of a particularly short braking distance. On the other hand, a disadvantage of this "full system" is its complexity and cost.

The second common ABS for tri-axle vehicles is also equipped with six wheel speed sensors, but only four modulators. This system is therefore known as the "6S/4M system." In the 6S/6M system, the front axle is equipped with two separate modulators providing IR, while the brake cylinders of the two rear axles are supplied jointly via only two modulators. In most cases, the common supply is of side-by-side design, meaning that the two wheels of one side of the vehicle are supplied jointly by one of the modulators.

It is also possible, however, to supply the two wheels of each axle with one common axle modulator (see WABCO Brochure ABS/ASR "D"—"CAB" version 8/99, p.9). The advantage of this "partial system" for tri-axle vehicles with common supply, as compared with IR, is that two fewer modulators are needed. This system is implemented with one of the above-noted regulation strategies (e.g., SL, SH, MAR or VAR).

Heretofore, two different configurations of ABS ECUs have been standard for the foregoing two systems: an ECU with six complete regulating channels (full system) for the 6S/6M system, and an ECU with only four complete regulating channels for the 6S/4M system (partial system). A complete regulating channel comprises the components and signals between wheel speed sensor and output amplifier or end stage for the modulator of a given vehicle wheel.

The ECUs of these two ABS versions have the same outward appearance, the difference is that, to save costs, two fewer end stages are built into the 6S/4M version. Consequently, manufacture of the ECUs for the two ABS versions require parts having separate identification. This translates into higher costs for production and warehousing, especially if only limited quantities of individual versions are sold.

Furthermore, if an ECU for a 6S/4M ABS were to be mistakenly installed in a vehicle ABS equipped for a 6S/6M ABS ECU, the 6S/4M ABS ECU would recognize two superfluous modulators and signal an error if the 6S/4M ABS ECU is properly connected to the 6S/6M ABS via the associated cable harness. However, if the plug connectors for the fifth and sixth modulators are not inserted in this case (the plug and socket connector between the cable harness and ABS ECU is the same for the two systems), the 6S/4M ABS ECU would detect only four modulators and thus would erroneously recognize the installation to be valid and would deliver regulation signals (SL) unsuitable for regulated braking.

Accordingly, it is desired to provide an improved ABS ECU that is compatible with both 6S/6M and 6S/4M ABSs and eliminates the need for maintaining a large inventory of different ABS ECUs for different ABSs. It is also desired to provide an improved ABS that avoids the afore-noted disadvantages associated with the installation of an incompatible ABS ECU.

SUMMARY OF THE INVENTION

Generally speaking, in accordance with the present invention, an ABS and an ABS ECU are provided which permit use of a single ABS ECU in different ABSs and which otherwise overcome the disadvantages associated with the prior art.

In a first aspect of the present invention, an ABS is provided for a tri-axle commercial vehicle. The ABS includes modulators which are either axle modulators, which control the supply of brake pressure to wheels on the same axle, or side by side modulators, which control the supply of brake pressure to wheels of the same side of the vehicle. The ABS also includes wheel speed sensors and a multi-channel ABS ECU for selectively controlling the modulators. Each modulator (axle or side-by-side) associated with the rear axles of the vehicle are actuated jointly by respective channels of the ECU associated with the rear axles.

In another aspect of the present invention, an ABS ECU having multiple channels is provided for controlling an ABS including modulators, wheel speed sensors and means for electrically connecting the modulators and wheel speed sensors to the ECU such that four channels of the multiple channels control the rear axle modulators. The ECU includes programmed logic for recognizing the type of ABS to which it is connected.

In yet another aspect of the present invention, a method for controlling an ABS having wheel speed sensors and modulators electrically connected to an ECU having multiple channels is provided. The method involves the steps of recognizing the type of ABS to which the ECU is coupled and selecting a regulation scheme based on the recognized type of ABS.

The present invention provides an improved ABS and an improved ABS ECU that is compatible with different types of ABSs to eliminate the need to maintain a large inventory of different ABS ECUs. Accordingly, the production, inventory, warehousing and other costs associated with maintaining multiple versions of ABS ECUs are avoided. The present invention also provides an improved ABS that avoids the above-described disadvantages associated with the installation of an incompatible ABS ECU.

Accordingly, it is an object of the present invention to provide an improved ABS and method.

Another object of the present invention is to provide an ABS ECU that is capable of sensing the type of ABS to which it is connected and reacting accordingly.

Another object of the present invention is to provide an ABS equipped with such an ABS ECU.

A further object of the present invention is to provide an ABS which overcomes the disadvantages associated with prior art systems and components.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which:

FIG. 2 is a block diagram showing ABS electronics of a 6S/4M ABS with modulators constructed and arranged according to the present invention.

DETAILED DESCRIPTION OF THE PREFERRED EMBODIMENTS

Figure 1A:
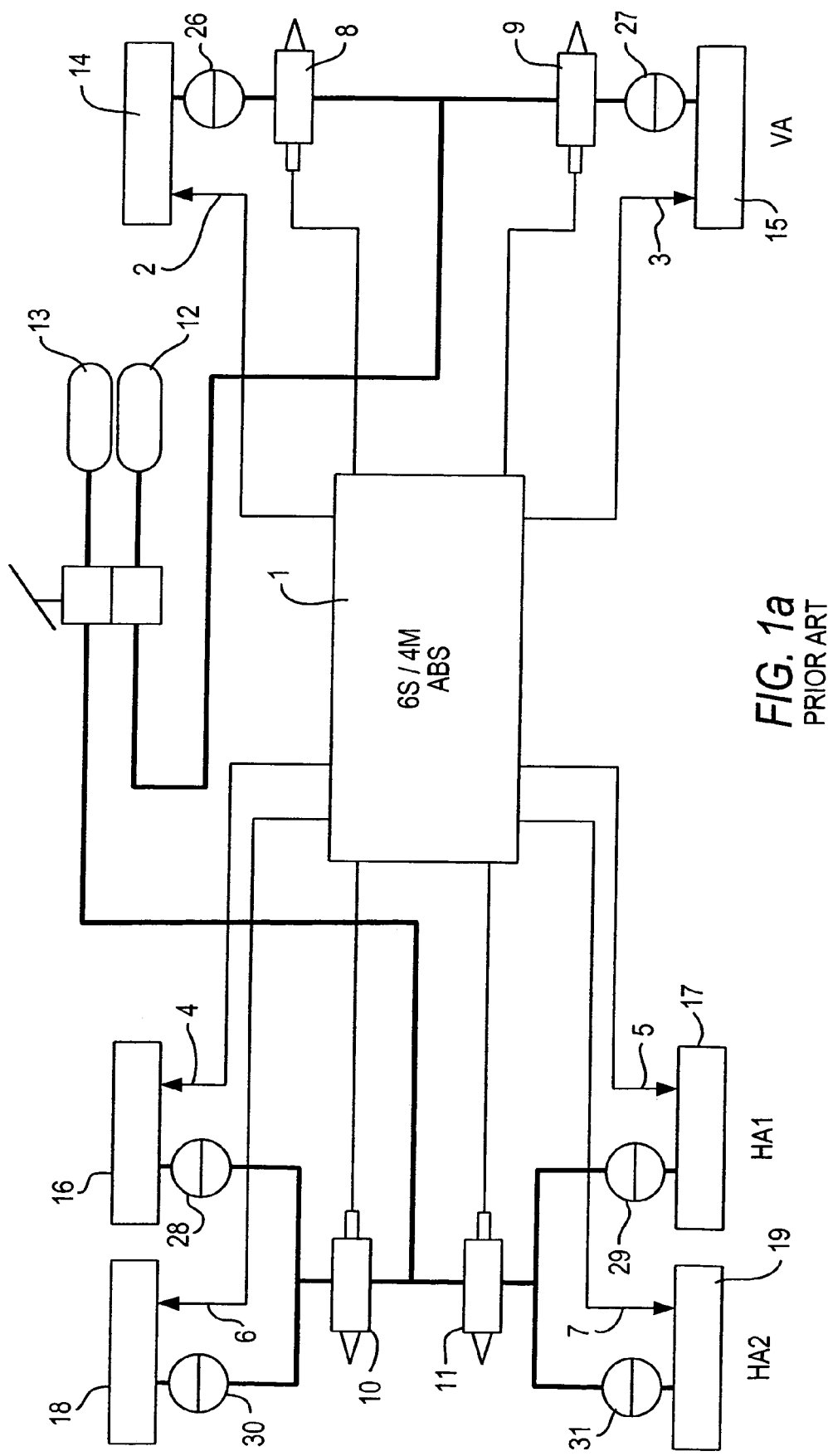
FIG. 1a is a schematic diagram showing the pneumatic and electrical systems of a tri-axle vehicle equipped with a conventional 6S/4M ABS (partial system)

Referring now to the drawing figures where like reference numerals are used for corresponding parts, FIG. 1a shows, in a simplified, schematic diagram, a conventional 6S/4M ABS (partial system) for a commercial tri-axle vehicle. The vehicle wheels 14 to 19 are associated with three axles, namely, a front axle VA, a first rear axle HA1 and a second rear axle HA2. The axles VA, HA1 and HA2 are preferably equipped with wheel speed sensors 2 to 7. The sensors 2 to 7 deliver speed signals to an ABS ECU 1.

If the wheels 14 to 19 exhibit a tendency to lock, the ABS ECU 1 actuates brake pressure modulators 8 to 11 in known manner, so that brake pressure in brake cylinders 26 to 31 can be increased, maintained or reduced. The brake medium, such as, for example, compressed air, is preferably contained in reservoirs 12, 13. It should be understood that hydraulic fluid can also be used as the brake medium. Furthermore, brakes applied by electric motors can also be used. The working principles of ABSs in general are known to those skilled in the art.

Figure 1B:
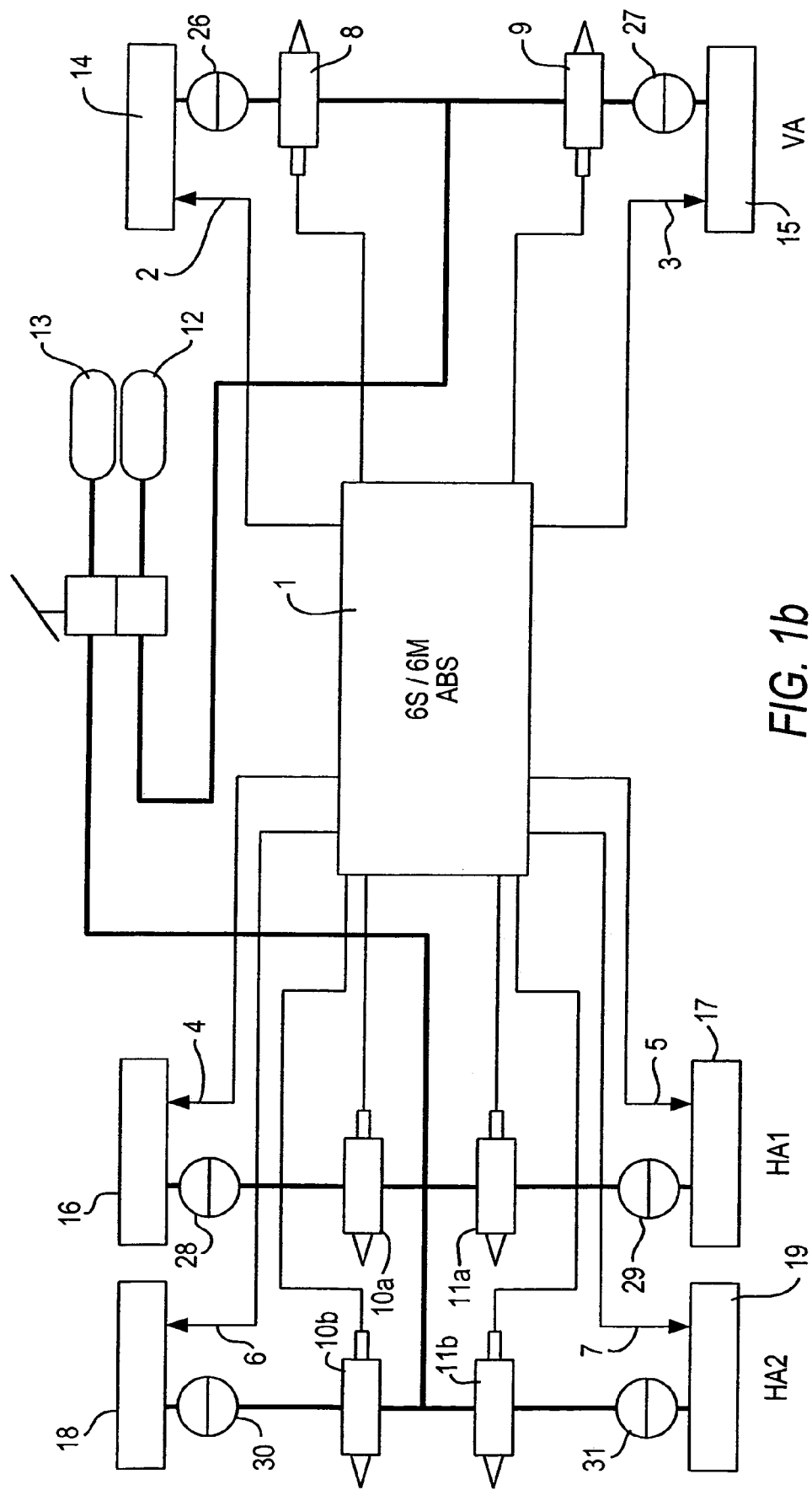
FIG. 1b is a schematic diagram showing the pneumatic and electrical systems of a tri-axle vehicle equipped with a conventional 6S/6M ABS (full system)

FIG. 1b shows, in a simplified, schematic diagram, a conventional 6S/6M ABS (full system) for a commercial tri-axle vehicle. Because the 6S/6M ABS has two more modulators for the rear axles HA1 and HA2 than does the 6S/4M ABS (partial system, FIG. 1a), the cost of the 6S/6M ABS is higher than that for the 6S/4M ABS.

Referring now to FIG. 2, there is shown, in block diagram format, ABS electronic circuitry of a six-channel ABS, together with the connected brake pressure modulators 8 to 11, according to the present invention. The ABS ECU 1 is preferably connected to six wheel speed sensors and to four brake pressure modulators 8 to 11 (i.e., 6S/4M), and internally is provided with six complete end stages 20 to 25. Each end stage 20 to 25 preferably includes two amplifiers 35, 36 for each inlet valve EV and outlet valve AV of the connected modulators 8 to 11. The output lines of the amplifiers 35, 36 are preferably connected via feedback lines 37 to the electronic circuitry of the ABS, thus allowing the status of the output lines to be sensed. Such feedback lines are known in the art (see e.g., DE 3928651).

By this arrangement, the ABS ECU 1 can recognize whether it is connected to an incompatible vehicle system, such as, for example, one with five modulators (6S/5M), when it receives no status information from one of its lines (i.e., the six-channel ABS ECU expects status signals from six modulators). Desirably, any incompatibility will be communicated by means of a suitable warning mechanism. The feedback lines 37 can also be used to check amplifier output for errors and to monitor load.

The signals of the wheel speed sensors 2 to 7 are also preferably delivered to the ABS ECU 1 (see e.g., FIGS. 1a, b).

All ABS connecting lines are preferably routed through a plug connection 34a, b, where a socket 34a is securely attached to the housing (shown in broken lines in FIG. 2) of the ABS ECU 1 and a plug 34b is connected to a cable harness 32. The plug connection 34a, b can be used for all versions of six-channel ABSs. A plurality of individual plugs can also be used.

The modulators 8 to 11 and the wheel speed sensors 2 to 7 are also preferably connected to the cable harness 32 (e.g., at the lower end of the harness). The connection of the cable harness 32 to the modulators 8 to 11 and the wheel speed sensors 2 to 7 is also preferably made via plug connections.

For increasing, maintaining or reducing the brake pressure as necessary, the modulators 8 to 11 each preferably include conventional inlet and outlet valves EV, AV which can be actuated electromagnetically. The modulators 8 to 11 are preferably disposed proximate to the vehicle wheels at front left and front right positions for front axle VA, and at rear left, rear right or middle positions for rear axles HA1, HA2. The modulators 8, 9 are preferably allocated to the front axle VA, and the modulators 10, 11 are preferably allocated to the rear axles HA1, HA2.

The actuating coils for inlet/outlet valves EV/AV of the modulator 11 can be energized (in the full system) by the respective amplifiers 35, 36.

The modulators 8 to 11 are preferably connected to common ground. The ground terminals can be provided directly at the installation location, or a connection to a common grounding point can be provided via the cable harness 32 or a further cable harness.

The six-channel ABS ECU 1 according to the present invention (FIG. 2) is basically intended for operation with six modulators (full system). In operational mode for the full system, all brake cylinders 26 to 31 of the tri-axle vehicle are allocated their own brake pressure modulators, and the vehicle is preferably regulated according to the principle of IR.

In the ABS used in the present invention, to reduce cost, only two modulators 10, 11 for lateral or axle-wise pressure control of the wheels of the rear axles HA1 and HA2 are used (partial system).

Referring to FIG. 1a, the brake cylinders 28, 30 of the left side of the vehicle are pressurized by the modulator 10, and the brake cylinders 29, 31 of the right side of the vehicle are pressurized by the modulator 11. The associated regulation scheme can be such that the two wheels of one side of the vehicle are regulated according to the speed signals of the wheel which exhibits the greatest slipping tendency (SL). It should be understood that other regulation strategies can also be employed.

According to the present invention (FIG. 2), the normal actuation of the modulator 10 by its associated end stage 23, and actuation of the modulator 11 by its associated end stage 25, are not used. Instead, actuation of both the rear axle modulators 10, 11 is effected jointly by all end stages 22 to 25 associated with the rear axles HA1 and HA2.

The cable harness 32 is specially designed for the 6S/4M ABS version used in connection with the present invention and includes only four modulator-actuating lines for the modulators 8 to 11. From the signals of the feedback lines 37, the ABS ECU 1 can recognize the connected 6S/4M partial system as a valid system.

The ABS ECU 1 is also suitable for a 6S/6M ABS (full system). In such case, additional modulators 45, 46 (depicted in broken lines in FIG. 2) for the rear axles HA1, HA2 are included. In addition, the cable harness 32 is equipped with two further modulator-actuating lines.

Referring to FIG. 2, for a 6S/4M system according to the present invention, the modulator 10 for the first rear axle HA1 is jointly actuated by the end stages 22 and 24. For this purpose, the modulator 10 is connected via its electrical inlet valve input 40 to the inlet valve output of the end stage 22 of the first channel for the first rear axle HA1. The axle modulator is also connected via its electrical outlet valve input 41 to the outlet valve output of the end stage 24 of the first channel for the second rear axle HA2.

The modulator 11 for the second rear axle HA2 is actuated jointly by the end stages 23 and 25. For this purpose, the modulator 11 is connected via its electrical inlet valve input 42 to the inlet valve output of the end stage 23 of the second channel for the first rear axle HA1, and via its electrical outlet valve input 43 to the outlet valve output of the end stage 25 of the second channel for the second rear axle HA2.

The outlet valve output of the end stage 22, the outlet valve output of the end stage 23, the inlet valve output of the end stage 24 and the inlet valve output of the end stage 25 are left unconnected.

The pin configuration of the connecting plug 34b is signaled back to the ABS ECU 1 via the feedback lines 37 enabling the ABS ECU 1 to recognize whether or not a compatible 6S/6M system or 6S/4M system is connected. On the basis of the pin configuration of the connecting plug 34b depicted in FIG. 2, the ABS ECU 1 is automatically programmed for side-by-side regulation of the rear wheels 16 and 18, 17 and 19 (FIG. 1).

If the ABS ECU 1 recognizes an incompatible system, a warning signal is preferably delivered via internal logic circuitry or programming.

The current status and/or the actual connections of the outputs of the end stages 20 to 25 of the ABS ECU 1 is sensed via the feedback lines 37 by the ABS ECU 1 which, from this information together with the number of connected wheel speed sensors, recognizes the configuration of the currently connected system. This is achieved by the logic programmed in the ABS.

The ABS according to the present invention (FIG. 2) has the further advantage that an error signal can be delivered even if two errors occur simultaneously, as explained hereinafter.

It is conceivable that, during installation in a vehicle, a 6S/4M ECU having only four completely built-in regulating channels might mistakenly be installed in a vehicle equipped with sensors and modulators for a 6S/6M full system (first error). Such a full system with an associated standard six-channel cable harness for 6S/6M as well as the additional modulators might then be connected to the 6S/4M ECU (via the plug 34b, which is uniform for all systems). In such case, the ABS ECU 1 would recognize, via the feedback lines 37, the superfluous modulators 45, 46 by means of internal logic circuitry or programming and would actuate a driver warning.

Additionally, if the two plug connections for the superfluous modulators were not connected (second error), a conventional ABS ECU would erroneously recognize the system as a valid 6S/4M system, and would deliver regulating signals that are unsuitable for the 6S/6M vehicle. Moreover, there would be no warning of this undesirable condition. This undesirable situation is, however, precluded by the present invention, since the unconnected modulators 45, 46 would be recognized via the feedback lines of the end stages 22, 24, and a corresponding error signal would be delivered.

By virtue of the built-in six end stages 20 to 25 in the ABS ECU 1 according to the present invention, the ECU can be used for both 6S/6M and 6S/4M systems, and there is no need to construct and warehouse different versions of the ECU. Furthermore, errors arising during installation of the ABS ECU in a vehicle are avoided.

Because the ABS ECUs are uniformly designed with six channels, the inventive ABS may be slightly more expensive than the conventional 6S/4M special model with only four complete regulating channels or end stages. This is compensated for, however, by the fact that only one type of ABS ECU with uniform part identification is needed, and can therefore be manufactured in greater numbers.

Accordingly, the present invention also provides an improved ABS ECU that avoids an undetected improper matching of the ABS ECU with an incompatible ABS.

It should be understood that, although the present invention is particularly compatible with 6S/6M and 6S/4M systems, the present invention may be applied to a wide variety of ABSs with appropriate modification. Moreover, the discussion herein of an ABS ECU compatible with a tri-axle vehicle is intended to be illustrative, and not to limit the scope of the present invention in any way.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An anti-lock brake system for a vehicle having at least three axles including wheels and wheel brakes, wheel speed sensors and four modulators for adjusting brake pressure, the system comprising an electronic control unit having six channels and means for electrically coupling with said four modulators, four of said six channels being adapted to jointly actuate two of said four modulators, said two jointly-actuated modulators being at least one of axle modulators for controlling the supply of brake pressure to a set of said wheels associated with the same one of said at least three axles and side-by-side modulators for controlling the supply of brake pressure to a set of said wheels on the same side of said vehicle.

2. An anti-lock brake system for a vehicle having at least three axles including wheels and wheel brakes, wheel speed sensors and four modulators for adjusting brake pressure, the system comprising an electronic control unit having six channels and means for electrically coupling with said four modulators, four of said six channels being adapted to jointly actuate two of said four modulators, said two jointly-actuated modulators being at least one of axle modulators for controlling the supply of brake pressure to a set of said wheels associated with the same one of said at least three axles and side-by-side modulators for controlling the supply of brake pressure to a set of said wheels on the same side of said vehicle, said control unit further including programmable storage means including instructions for detecting the type of anti-lock brake system to which said electronic control unit is connected and instructions for selecting an anti-lock brake regulation scheme based on the detected type of anti-lock brake system.

3. The anti-lock brake system according to claim 1, wherein said at least three axles include a first rear axle and a second rear axle, and said two jointly-actuated modulators are associated with said first and second rear axles.

4. An electronic control unit for controlling an anti-lock brake system for a vehicle having at least three axles including wheels and wheel brakes, wheel speed sensors and four modulators for adjusting brake pressure, the electronic control unit comprising six channels and means for electrically coupling with said four modulators, four of said six channels being adapted to jointly actuate two of said four modulators, said two jointly-actuated modulators being at least one of axle modulators for controlling the supply of brake pressure to a set of said wheels associated with the same one of said at least three axles and side-by-side modulators for controlling the supply of brake pressure to a set of said wheels on the same side of said vehicle.

5. An electronic control unit for controlling an anti-lock brake system for a vehicle having at least three axles including wheels and wheel brakes, wheel speed sensors and four modulators for adjusting brake pressure, the electronic control unit comprising six channels and means for electrically coupling with said four modulators, four of said six channels being adapted to jointly actuate two of said four modulators, said two jointly-actuated modulators being at least one of axle modulators for controlling the supply of brake pressure to a set of said wheels associated with the same one of said at least three axles and side-by-side modulators for controlling the supply of brake pressure to a set of said wheels on the same side of said vehicle, said electronic control unit further including programmable storage means including instructions for detecting the type of anti-lock brake system to which said electronic control unit is connected and instructions for selecting an anti-lock brake regulation scheme based on the detected type of anti-lock brake system.

6. The electronic control unit according to claim 5, further comprising instructions for determining whether said electronic control unit is coupled to a compatible anti-lock brake system.

7. The electronic control unit according to claim 6, wherein said electronic control unit is adapted to generate a warning if said electronic control unit fails to determine that it is connected to a compatible anti-lock brake system.

8. An electronic control unit for controlling an anti-lock brake system for a vehicle having at least three axles including a first rear axle and a second rear axle, wheels and wheel brakes, wheel speed sensors and four modulators for adjusting brake pressure, the electronic control unit comprising six channels and means for electrically coupling with said four modulators, four of said six channels being adapted to jointly actuate two of said four modulators, said two jointly-actuated modulators being associated with said first and second rear axles and being at least one of axle modulators for controlling the supply of brake pressure to a set of said wheels associated with the same one of said at least three axles and side-by-side modulators for controlling the supply of brake pressure to a set of said wheels on the same side of said vehicle.

9. In an anti-lock brake system of a vehicle having at least three axles including wheels and wheel brakes, wheel speed sensors, four modulators for adjusting brake pressure, and an electronic control unit including six channels electrically coupled to said four modulators, a method for controlling the anti-lock brake system comprising the step of jointly actuating two of said four modulators by four of said six channels, said two jointly-actuated modulators being at least one of axle modulators for controlling the supply of brake pressure to a set of said wheels associated with the same one of said at least three axles and side-by-side modulators for controlling the supply of brake pressure to a set of said wheels on the same side of said vehicle.

10. In an anti-lock brake system of a vehicle having at least three axles including a first rear axle and a second rear axle, wheels and wheel brakes, wheel speed sensors, four modulators for adjusting brake pressure, and an electronic control unit including six channels electrically coupled to said four modulators, a method for controlling the anti-lock brake system, comprising the step of jointly actuating two of said four modulators by four of said six channels, said two jointly-actuated modulators being associated with said first and second rear axles and being at least one of axle modulators for controlling the supply of brake pressure to a set of said wheels associated with the same one of said at least three axles and side-by-side modulators for controlling the supply of brake pressure to a set of said wheels on the same side of said vehicle.

11. In an anti-lock brake system of a vehicle having at least three axles including wheels and wheel brakes, wheel speed sensors, four modulators for adjusting brake pressure, and an electronic control unit including six channels electrically coupled to said four modulators, a method for controlling the anti-lock brake system, comprising the steps of jointly actuating two of said four modulators by four of said six channels, said two jointly-actuated modulators being at least one of axle modulators for controlling the supply of brake pressure to a set of said wheels associated with the same one of said at least three axles and side-by-side modulators for controlling the supply of brake pressure to a set of said wheels on the same side of said vehicle, detecting the type of anti-lock brake system to which said electronic control unit is connected, and selecting an anti-lock brake regulation scheme based on the detected type of anti-lock brake system.

12. The method according to claim 11, further comprising the step of causing said electronic control unit to detect if the anti-lock brake system to which it is coupled is a compatible anti-lock brake system.

13. The method according to claim 12, further comprising the step of causing the electronic control unit to generate a warning if said electronic control unit fails to determine that the anti-lock brake system to which it is coupled is a compatible anti-lock brake system.

* * * * *